March 18, 1958  T. L. MENGE  2,826,889
EDGER AND TRIMMER FOR LAWNS AND THE LIKE
Filed Nov. 3, 1954  4 Sheets-Sheet 1

Inventor
Theodore L. Menge
By John C. Brady
Attorney

March 18, 1958 T. L. MENGE 2,826,889
EDGER AND TRIMMER FOR LAWNS AND THE LIKE
Filed Nov. 3, 1954 4 Sheets-Sheet 2
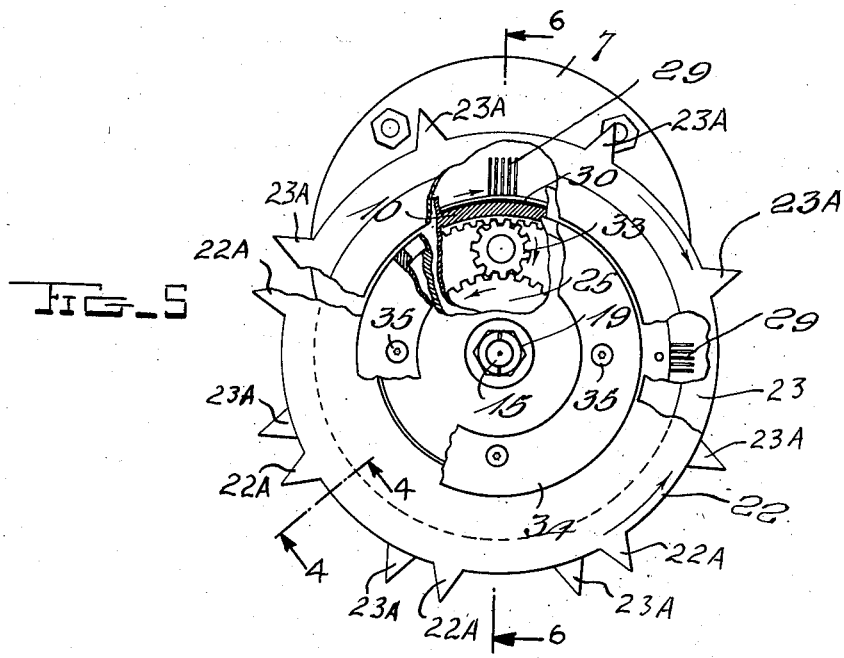
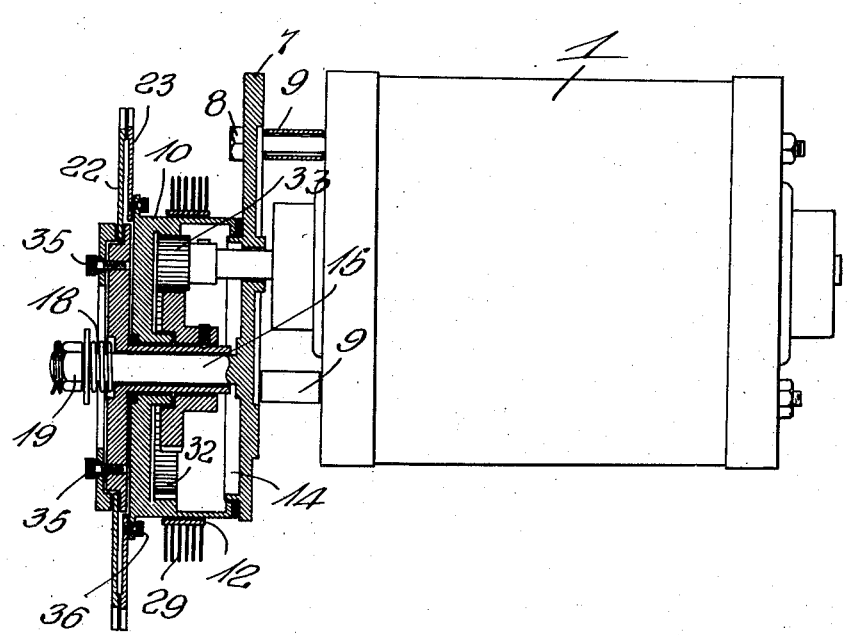
Inventor
Theodore L. Menge
By John B. Brady
Attorney

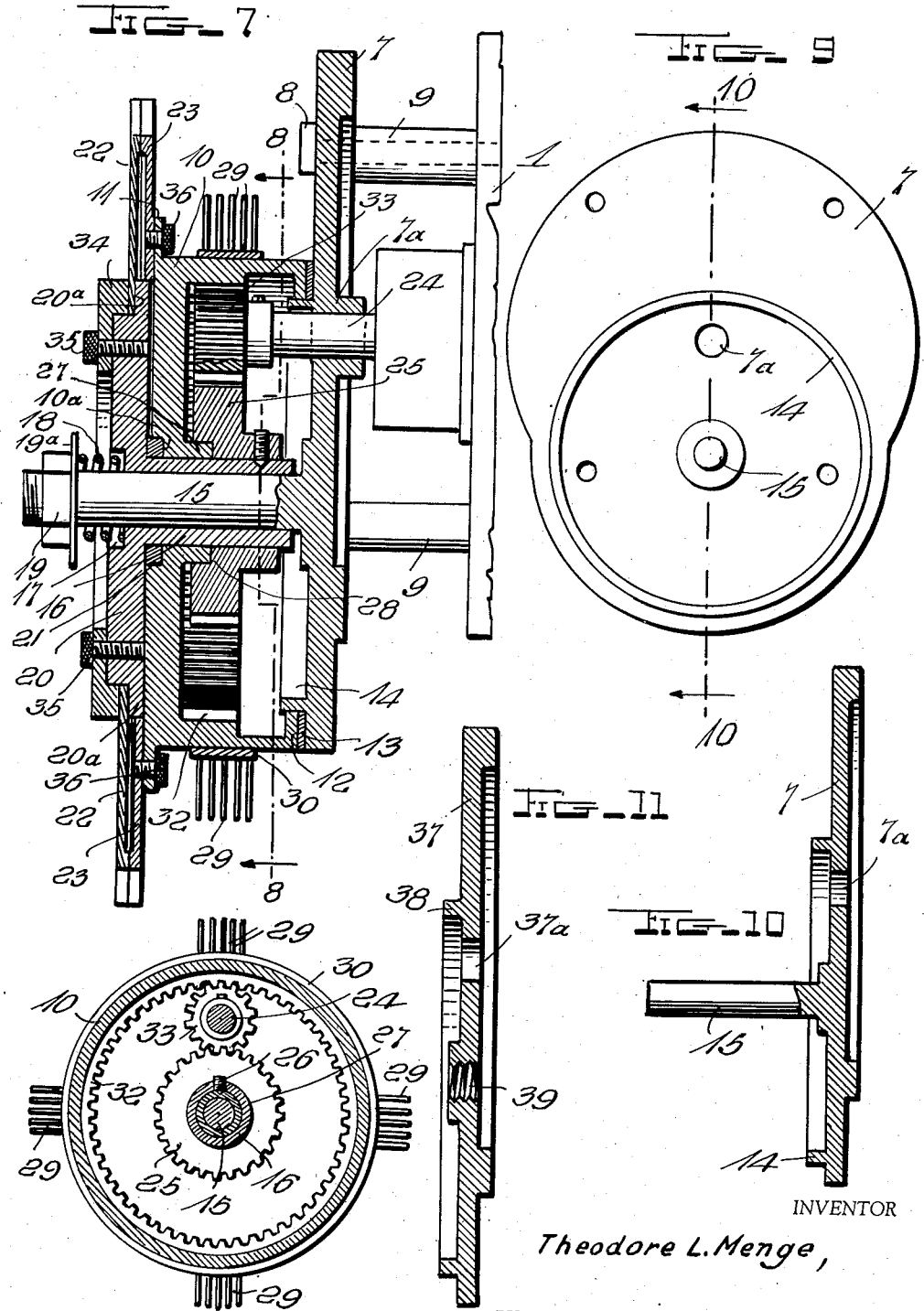

March 18, 1958 T. L. MENGE 2,826,889
EDGER AND TRIMMER FOR LAWNS AND THE LIKE
Filed Nov. 3, 1954 4 Sheets-Sheet 4
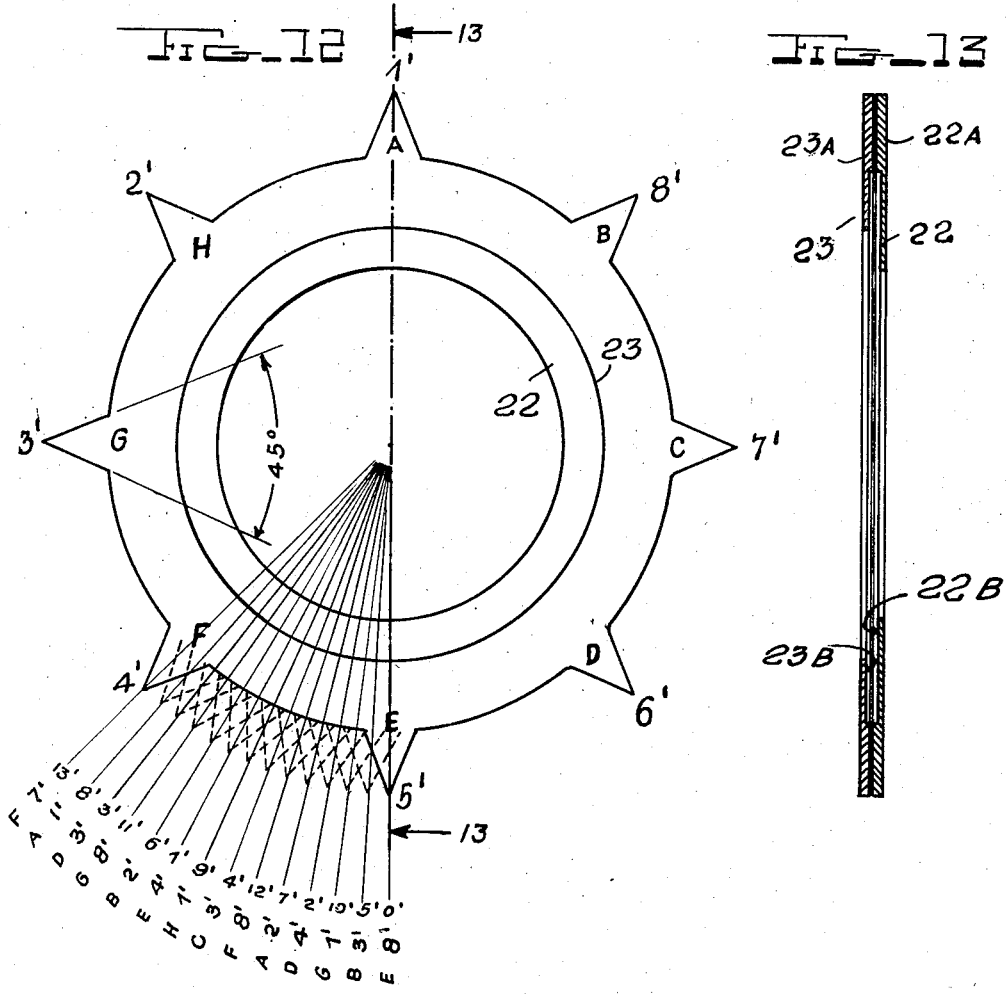
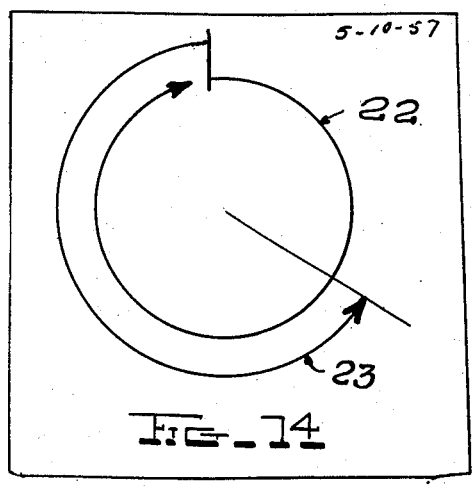
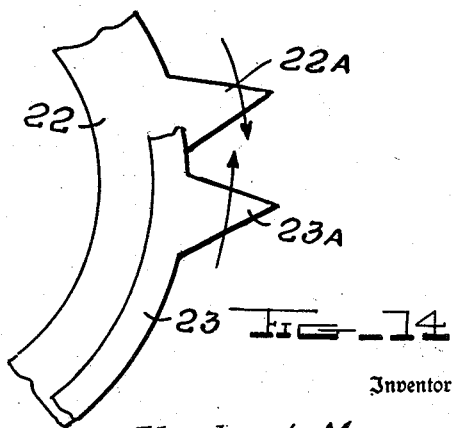
Inventor
Theodore L. Menge,
By John B. Brady
Attorney United States Patent Office 2,826,889
Patented Mar. 18, 1958

2,826,889

EDGER AND TRIMMER FOR LAWNS AND THE LIKE

Theodore L. Menge, Shreveport, La., assignor of one-half to Edward C. Laster, Sr., Shreveport, La.

Application November 3, 1954, Serial No. 466,473

6 Claims. (Cl. 56—25.4)

My invention relates broadly to edgers and trimmers for lawns and the like, and more particularly to an improved arrangement of cutter blades for such edgers and trimmers.

One of the objects of my invention is to provide a construction of dual cutter blade arrangement in which the blades move in circular paths with respect to each other in self-counterbalancing arrangement for minimizing vibration and reducing the tendency of the cutter blades to agitate and propel stones and the like, for reducing danger to the operator using the edger and trimmer.

Another object of my invention is to provide a counterbalanced arrangement of cutter blades for a lawn edger or trimmer which may readily be removed for sharpening and replaced for insuring maximum cutting efficiency in the tool.

A further object of my invention is to provide an arrangement of dynamically balanced drive mechanism for the cutter blades of a lawn edger and trimmer in which the blades are rotatively driven at differential speeds in opposite directions where one drive force counteracts the opposite drive force.

Still another object of my invention is to provide a rotatable drive assembly for a lawn edger and trimmer in which rotatably driven cutter blades are readily detachable and replaceable with respect to the drive for sharpening and repair.

A still further object of my invention is to provide means for maintaining a center blade assembly in position with respect to a rotatable drive for the cutter blades and simultaneously maintaining a rotatable housing in a lubricant-enclosing position with respect to the driving mechanism.

A still further object of my invention is to provide an arrangement of rotatably driven cutter blade housing in an edger and trimmer device which also supports a brush in a position adjacent the cutter blades for sweeping the work-path immediately adjacent the cutter blades during rotatable operation of the device.

Other and further objects of my invention reside in the unique assembly of the cutter head in the tool of my invention as set forth more fully in the specification hereinafter following by reference to the accompanying drawings, in which:

Fig. 5 is an end view of the tool of my invention with parts broken away to illustrate the details of construction;

Fig. 6 is a longitudinal sectional view taken through the tool of my invention associated with the driving unit the view being taken substantially on line 6—6 of Fig. 5;

Fig. 7 is an enlarged view similar to Fig. 6 showing particularly the manner in which the securing means for the cutter blades also serves to maintain the housing of the device in lubricant-sealing position around the driving mechanism;

Fig. 8 is a reduced transverse sectional view taken on line 8—8 of Fig. 7 and showing particularly the arrangement of the driving mechanism of the tool;

Fig. 9 is a plan view of the base plate for the tool;

Fig. 10 is a vertical sectional view on line 10—10 of Fig. 9;

Fig. 11 is a cross sectional view similar to Fig. 10 of a modified form of base plate which may be employed in the structure of my invention;

Fig. 12 is a plan view illustrating the principle involved in laying out the cutting teeth on the cutting blades in the tool of my invention;

Fig. 13 is a sectional view through the coacting cutter blades arranged in accordance with my invention the view being taken substantially on line 13—13 of Fig. 12; and Fig. 14 is a fragmentary enlarged view showing a pair of cutter teeth and the manner in which the cutter teeth coact when driven from opposite directions to perform a cutting operation.

My invention is directed to a construction of lawn edger and trimmer which employs a pair of rotatably driven multiple-toothed cutter members which are differentially driven in opposite directions for counterbalancing the driving effect of the blades and minimizing vibration and reducing the danger of throwing objects, such as loose rock, sand, dirt or foreign matter in a perilous direction.

The device of my invention employs a pair of cutter blades having coacting teeth which move in opposite rotative directions at speeds of the order of 323 R. P. M. and 517.5 R. P. M., being driven from a ¼ H. P. electric motor at 1725 R. P. M. The lower speed cutter is arranged in a position where contact may possibly be made with loose rock, sand or dirt, or foreign objects, whereas the higher speed cutter is more remote for eliminating danger arising from impact of the blades with such material. The differentially driven cutter blades coact to counterbalance each other and substantially eliminate vibration. The cutter blade assembly is detachably mounted with respect to a rotatably driven housing which may be rotatively supported on a base plate adapted to be mounted on the driving unit. The housing encloses a driving gear system which may be packed in lubricant and the lubricant maintained therein by the assembly of the housing with respect to the base plate through the same means which supports the cutter blades in position. The gear system within the housing is so proportioned that the differential operation of one cutter blade in a direction opposite to the direction of motion of the other cutter blade is assured. A brush assembly is carried by the rotatable housing for clearing a path immediately adjacent the rotative cutter blade of lower speed. The entire driving unit is mounted upon a wheeled carrier on trunnions so that the cutter blade assembly may be used in a horizontal position for lawn trimming and in a vertical position for lawn edging.

Figure 1:
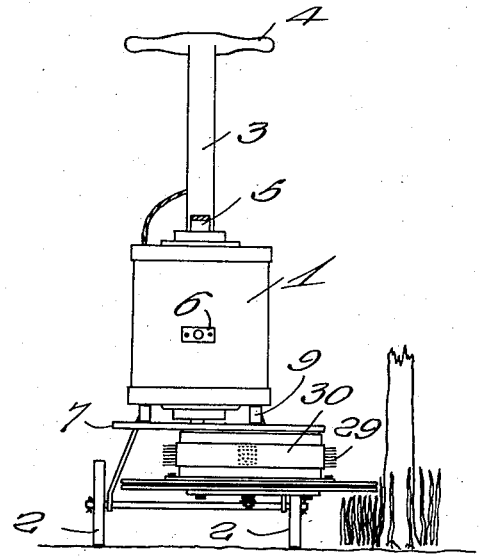
Fig. 1 is a front elevational view with parts broken away and shown in section of the tool of my invention employed as a lawn trimmer.

Referring to the drawings in detail, reference character 1 designates a motive power source such as an electric motor which is supported on a wheeled frame structure represented at 2 which may be moved by a handle 3 and handle bar 4. A trunnion strap 5 is connected with frame 2 and is provided with pivots 6 which establish connection with the trunnion strap 5, enabling the drive unit to be used either in the position shown in Fig. 1 for lawn trimming, or in Fig. 2 for lawn edging.

The cutter assembly of my invention is mounted upon a base plate indicated at 7 which may be connected through bolts 8 with the casing of the motor 1 through spacing sleeves 9 as shown more clearly in Fig. 7. The edger housing is shown at 10 comprising a cylindrical shell having an outwardly extending end flange 11 on one end thereof for supporting the inside cutter blade and an inwardly extending flange 12 on the other end thereof for supporting the housing 10 with respect to the base plate 7. A grease seal 13 is provided between the inwardly extending flange 12 and the annular rim 14 on base 7. The inwardly extending flange 12 revolves about the rim 14 and the grease seal 13. The base plate 7 is provided with an outwardly projecting stub-shaft 15 disposed centrally within rim 14 and forms a journal for the outer shaft sleeve 16. The outer shaft sleeve 16 terminates in a spindle plate 20 and has a central recess 17 in the end thereof into which coil spring 18 yieldably fits. Coil spring 18 is yieldingly maintained in a position concentrically around shaft 15 by means of fastening nut 19 and coacting washer 19a. The spindle plate 20 yieldably seats against a grease seal 21 retained in a central recess 10a in housing 10.

The flange 11 on housing 10 serves as a carrier for the detachable inner cutter blade 23 which is secured thereto by means of screw-threaded studs 36. The outer cutter blade 22 is secured to the spindle plate 20 by means of the retaining outer ring 34 and detachable studs 35. An annular shoulder 20a is provided on spindle plate 20 against which the outer cutter blade 22 seats. It will be observed that the inner cutter blade 23 and the outer cutter blade 22 have different inside diameters as represented more clearly in Fig. 13, while the cutter teeth shown in Fig. 13 at 23A and 22A are peripherally aligned. The power drive shaft extending from motor 1 is indicated at 24 passing loosely through an aperature 7a in base plate 7 and projecting into the interior of the hollow cylindrical housing 10 and carrying pinion 33 thereon. Pinion 33 meshes with the ring gear 32 on the interior wall of housing 10 on the one side and with the spur gear 25 carried by outer spindle sleeve 16 on the other side as shown more clearly in Fig. 8. The spur gear 25 is fastened to outer spindle sleeve 16 through set screw 26. The housing 10 terminates in an interior annular sleeve 27 which rotates about the outer spindle sleeve 16 as a bearing. The spur gear 25 is recessed in one side thereof at 28 to fit over the interior annular sleeve 27 on housing 10. Thus a clockwise movement of drive shaft 24 revolves pinion 33 in a clockwise direction imparting movement to ring gear 32 in a clockwise direction while spur gear 25 is driven in a counterclockwise direction and at a different speed than ring gear 32. Thus inner cutter blade 23 and outer cutter blade 22 are revolved in opposite directions with reference to each other and at different speeds.

Figure 2:
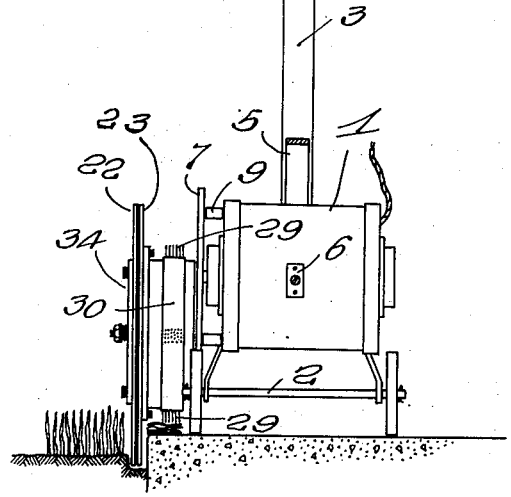
Fig. 2 shows with parts broken away and shown in section the application of my invention as a lawn edger.

The housing 10 also carries on its outer periphery a ring 30 which supports groups of spaced wire brushes shown at 29, spaced approximately 90° apart. These wire brushes serve, as indicated in Fig. 2, to clear away debris and cuttings adjacent the cutter blades when the tool is used as a lawn edger.

In Fig. 11 I have shown a modified form of base plate at 37 where the plate is screw-threaded at 39 for receiving the screw-threaded end of a shaft corresponding to shaft 15 in Fig. 10. By fabricating the plate 37 in this manner it is unnecessary to cast the shaft 15 integrally with plate 7, and a separate shaft may be fabricated and applied to plate 37. In this construction plate 37 has an aperture 37a therein for the passage of the drive shaft 24 and there is a rim 38 thereon providing the guide means for the rotatable housing 10.

Figure 4:
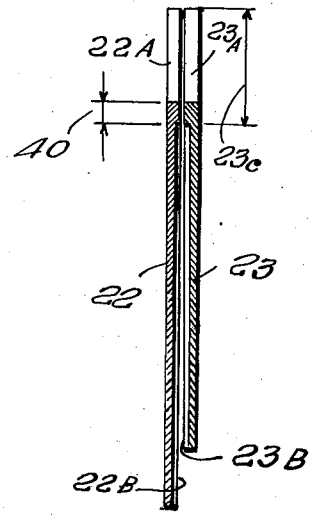
Fig. 4 is an enlarged cross sectional view of a portion of the coacting differentially driven cutter blades on an enlarged scale the view being taken on line 4—4 of Fig. 5.

Figs. 12 and 14 explain more fully the coaction of the inner and outer cutter blades 23 and 22. Each cutting tooth is formed with edges disposed at 45° with respect to each other. In Fig. 12 the symetrical shape of the teeth has been represented, where 3', 8' and 6', for example, form apices of an equi-lateral triangle. The other teeth are similarly positioned. As represented in Fig. 13, the inner cutter disc 23 and the outer cutter disc 22 each includes annular shoulders which bear against each other face to face, as represented more clearly in Fig. 4, to provide stabilizing bearing surfaces for inner cutter blade 23 and outer cutter blade 22, as represented at 23C. The annular zone of contact between the inner and outer cutter blades 23 and 22 is represented at 40 in Fig. 4. The more central portions of the inner and outer cutter blades are constituted by surfaces offset from each other as indicated in Figs. 6, 7, and 13, at 23B and 22B. The inner cutter blade revolves at the lower rate of speed and is the more likely blade to contact solid material as represented in Fig. 2. The outer blade 22 revolves at the higher rate of speed. While outer cutter blade 22 revolves eight times, inner cutter blade 23 revolves five times in the opposite direction. Assuming that eight cutter teeth are provided on each blade as represented in Fig. 12, the cutter teeth 1', 2', 3', 4', 5', 6', 7' and 8' are arranged on the higher speed cutter blade 22 and in Fig. 12 are behind cutter blades A, B, C, D, E, F, G and H which are arranged on the lower speed cutter blade 23. The teeth are represented at 23A and 22A in Figs. 13 and 14, approaching each other to execute a severing operation with respect to material that may be gathered therebetween. Referring to Fig. 12 I have represented the order in which the cutter teeth match up during one complete revolution of the slower-speed cutter blade so as to shear efficiently through the entire 45-degree sector. Starting with the cutter teeth in the positions shown in Fig. 12, wherein tooth E on one cutter blade is matched with tooth 5' on the other cutter blade, assume that the cutter blade bearing teeth A, B, . . . H rotates clockwise while the cutter blade bearing teeth 1', 2', . . . 8' rotates counterclockwise. Teeth E and 4' will travel toward each other, and they will be in conjunction at the position marked E4' 1' in Fig. 12, wherein E refers to tooth E on one cutter blade, 4' refers to tooth 4' on the other cutter blade, and 1' refers to the position shown within the 45 degree sector. As rotation continues, tooth 4' and tooth E will separate. Tooth E will pass out of the sector of interest, and tooth 4' and tooth D approach each other. They come into conjunction at position 2', indicated in Fig. 12 at D 4' 2'. As rotation continues, tooth 4' passes out of the sector and tooth D approaches tooth 3', the two eventually coming into conjunction at position 3', marked by the symbols D 3' 3' in Fig. 12. In a similar manner, as rotation continues, the remaining teeth come into conjunction within the same 45 degree sector in the sequence indicated in Fig. 12, until tooth E has made a complete revolution and is again at its starting position. However, tooth E is not now in conjunction with tooth 5' as in the beginning, but instead is in conjunction with tooth 8'. The position sequence of the succeeding conjunctions is shown in Fig. 12 by the numbers 1', 2', . . . 13' (or 0' which position is the equivalent of 13') while the teeth that are in conjunction at the stated position are indicated by the respective symbols E 4', D 4', . . . F 7" (or E 8'). Thus shearing action takes place throughout the entire 45 degree sector during one revolution of the slower-speed blade. Of course, exactly similar action occurs in each of the remaining 45 degree sectors around the perpihery of the cutter blades, although the work of cutting grass or the like seldom occurs over more than about 45 degrees of the cutter's periphery. Accordingly, with but eight cutter teeth on each cutter blade, shearing action is applied without gaps around the entire periphery of the cutter blades. By virtue of the successive, rather than simultaneous, shearing in any one 45 degree sector, the full power of the prime mover is available to be applied to one pair of cutter teeth at a time. As a consequence, a relatively low-powered motor will suffice even though the cutter blades do not turn at the high, and somewhat dangerous, speeds necessary in some edgers and lawn trimmers now on the market.

The action just described was predicated on an eight to five ratio of movement between the cutter blades with eight teeth on each blade. The cutter blades may be formed conveniently on discs 10 inches in diameter. In this case the minimum distance between shears is 1½ inches and the maximum distance is approximately 2½ inches. The teeth then are approximately 4 13/16 inches apart. I have found this arrangement to be quite effective. The angles of matching of the teeth on the two discs in the action described above are:

| Positions of Teeth | Angle Between Matching of Teeth | | |
|---|---|---|---|
| | (°) | (′) | (″) |
| 0′ to 1′ | +27 | 41 | 32.3077 |
| 1′ to 2′ | −17 | 18 | 27.6923 |
| 2′ to 3′ | +27 | 41 | 32.3077 |
| 3′ to 4′ | −17 | 18 | 27.6923 |
| 4′ to 5′ | −17 | 18 | 27.6923 |
| 5′ to 6′ | +27 | 41 | 32.3077 |
| 6′ to 7′ | −17 | 18 | 27.6923 |
| 7′ to 8′ | +27 | 41 | 32.3077 |
| 8′ to 9′ | −17 | 18 | 27.6923 |
| 9′ to 10′ | −17 | 18 | 27.6923 |
| 10′ to 11′ | +27 | 41 | 32.3077 |
| 11′ to 12′ | −17 | 18 | 27.6923 |
| 12′ to 13′ | +27 | 41 | 32.3077 |
| Sum | 45° | 0′ | 0″ |

Summarizing the foregoing explanation it will be observed that each of the rotating cutting blades has eight teeth on the periphery thereof, said teeth being equally spaced apart. As each tooth on one blade approaches a similar tooth on the other blade and finally becomes aligned therewith all other teeth on the two blades will likewise become aligned. When considering Fig. 12, if blade 23 rotates counterclockwise and blade 22 clockwise, during rotation tooth A will first become aligned with tooth 2′ and then with 3′, etc.

Figure 3:
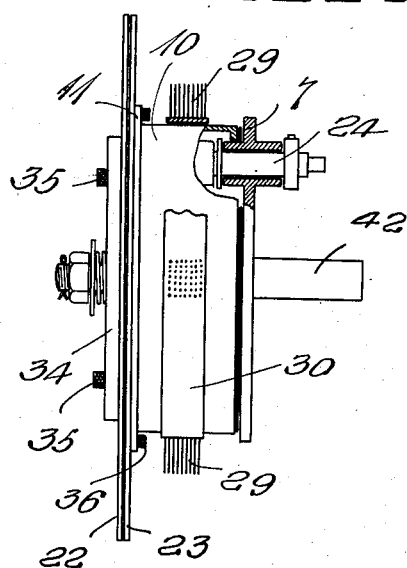
Fig. 3 is a side elevational view of the tool of my invention on a slightly enlarged scale with parts of the housing, the base plate and the brush-carrying ring broken away and illustrated in section and driven from a power shaft.

Fig. 3 illustrates a special form of my invention wherein base plate 7 is supported by a handle device 42 that may be manually manipulated for the cutting of a hedge, vines, etc, and the cutter blades driven by means of a flexible shaft connected to the drive shaft 2 of the device. Any form of motive power such as a gasoline engine or a motor may be connected to drive shaft 24 of the device or a pulley may be mounted on drive shaft 24 and the pulley driven by a belt operating from any kind of prime mover. Thus the edging unit may be purchased without a drive and the drive otherwise supplied by the purchaser. The device of Fig. 3 is an attachment as distinguished from the complete machine of Figs. 1 and 2.

Fig. 5 schematically shows the positions of the teeth of the structure shown in Fig. 12. There are eight teeth on each of the cutter blades 22 and 23, as shown in Fig. 12, and the teeth are driven in opposite rotative directions and occupy the successive positions indicated in Fig. 5 in effecting the cutting operation.

I have found the edger and trimmer of my invention highly practical and efficient in operation and while I have described my invention in certain preferred embodiments, I realize that modifications may be made, and I desire that it be understood that no limitations upon my invention are intended other than may be imposed by the scope of the appended claims.

What I claim as new and desire to secure by Letters Patent of the United States is as follows:

1. An edger and trimmer tool comprising a base plate, a prime mover mounted on one side of said base plate, an annular rim on the other side of said base plate, a hollow cylindrical housing terminating in an interior annular sleeve on one end and an inwardly extending annular flange on the other end, the inwardly extending annular flange of said housing being rotatably mounted on said annular rim, a stub shaft carried by said base plate and projecting through both ends of said housing, an outer spindle sleeve journaled on said stub-shaft and forming a bearing for said interior annular sleeve of said housing, a circular spindle plate carried by said sleeve in a position exterior of said housing and extending in a plane parallel to the end of said housing, a toothed cutter disc carried by said housing, a coacting toothed cutter disc carried by said circular spindle plate and means enclosed in said hollow cylindrical housing for differentially driving said cutter discs in opposite directions with respect to each other.

2. An edger and trimmer tool as set forth in claim 1 in which said housing includes an annular flange and means for removably mounting the toothed cutter disc carried thereby, and separate means for removably mounting the coacting cutter disc carried by said sleeve and circular spindle plate.

3. An edger and trimmer tool as set forth in claim 1 in which the interior of said hollow cylindrical housing is provided with a ring gear and wherein said outer spindle sleeve has a spur gear connected therewith interiorly of said housing in coplanar relation to said ring gear and a pinion connected with said prime mover and disposed interiorly of said housing intermediate said ring gear and said spur gear and intermeshed therewith for rotatably driving said housing in one direction and rotatably driving said sleeve and circular spindle plate in the opposite direction.

4. An edger and trimmer tool as set forth in claim 1 in which lubricant seals are provided between said housing and said base plate and intermediate said housing and said circular spindle plate for retaining a filling of lubricant within said housing, and means engaging the end of said stub shaft for yieldably maintaining said housing and said circular spindle plate in rotative engagement with said annular rim.

5. An edger and trimmer tool as set forth in claim 1 in which both of said cutter discs have open circular centers with the extremities of the teeth on said discs disposed on the same external diameters and the open centers of said discs disposed on internal diameters substantially differing from each other with the disc of larger internal diameter operating at a lower speed than the disc of smaller internal diameter.

6. A rotary cutting device comprising a driving mechanism, a base plate supported on said mechanism, an annular rim formed on said plate, a stub shaft extending from said plate centrally of said annular rim, an outer spindle sleeve rotatable on said shaft and terminating in a flat circular plate, a housing terminating in an interior annular sleeve rotatable about said outer spindle sleeve, said housing having an annular skirt rotatably engaging said annular rim, a cutting member attached to the end of said housing adjacent said flat circular plate, a coacting cutting member attached to said flat circular plate, spring means interposed between the end of said stub shaft and said flat circular plate for yieldably urging said flat circular plate in rotative engagement with the end of said housing and gear means within said housing for rotatably driving said housing and said flat circular plate from said driving mechanism.

References Cited in the file of this patent
UNITED STATES PATENTS

| | | |
|---|---|---|
| 222,626 | Gates | Dec. 16, 1879 |
| 1,472,587 | Crowder | Oct. 30, 1923 |
| 1,608,031 | Poglein | Nov. 23, 1926 |
| 2,496,377 | Cochran | Feb. 7, 1950 |
| 2,499,070 | Ledbetter | Feb. 28, 1950 |
| 2,556,790 | Berdan | June 12, 1951 |
| 2,608,043 | Berdan | Aug. 26, 1952 |
| 2,691,264 | Miller | Oct. 12, 1954 |